United States Patent [19]

Hubbling

[11] Patent Number: 5,362,172
[45] Date of Patent: Nov. 8, 1994

[54] PRESS FIT ASSEMBLY BOSS FOR DISKETTES

[75] Inventor: David L. Hubbling, Breckenridge, Minn.

[73] Assignee: Minnesota Mining and Manufacturing Company, St. Paul, Minn.

[21] Appl. No.: 937,143

[22] Filed: Aug. 31, 1992

[51] Int. Cl.⁵ .................................. F16B 4/00
[52] U.S. Cl. ......................... 403/282; 403/345; 403/361; 403/404; 411/339; 360/133; 369/291
[58] Field of Search ........... 369/291; 360/133, 132; 403/361, 354, 344, 24, 282, 280, 383, 274, 276, 404, 345; 411/338, 339, 514; 242/199; 24/453, 662; 285/382, 256

[56] References Cited

U.S. PATENT DOCUMENTS

| | | | |
|---|---|---|---|
| 3,169,439 | 2/1965 | Rapata | 411/500 |
| 3,545,798 | 12/1970 | Swett et al. | 24/662 X |
| 4,089,612 | 5/1978 | Mazzeo | 403/361 |
| 4,371,131 | 2/1983 | Okamura et al. | 242/199 |
| 4,384,803 | 5/1983 | Cachia | 411/339 X |
| 4,384,804 | 5/1983 | Cachia et al. | 403/282 X |
| 4,564,878 | 1/1986 | Weavers et al. | 242/199 X |
| 4,573,572 | 3/1986 | Kato et al. | 360/132 X |
| 5,075,810 | 12/1991 | Iwahashi | 360/132 |
| 5,121,279 | 6/1992 | Saeki et al. | 360/132 X |

FOREIGN PATENT DOCUMENTS 960800 6/1964 United Kingdom ............... 403/383

Primary Examiner—Randolph A. Reese
Assistant Examiner—Harry C. Kim
Attorney, Agent, or Firm—Gary L. Griswold; Walter N. Kirn; Charles D. Levine

[57] ABSTRACT

A press fit assembly boss for aligning and assembling the case walls of a diskette includes a circular cylindrical post formed on the upper case wall and a cylindrical socket formed on the lower case wall. The inner surface of the socket includes two opposing planar sections separated by a distance less than the outer diameter of the post. Insertion of the post in the socket deforms the post to secure the post within the socket without creating any debris during assembly or disassembly. The cylindrical post has thin walls.

7 Claims, 2 Drawing Sheets

PRESS FIT ASSEMBLY BOSS FOR DISKETTES

TECHNICAL FIELD

The present invention relates to computer diskettes. More particularly, the present invention relates to press fit assembly bosses for assembling computer diskettes.

BACKGROUND OF THE INVENTION

Rigid recording disk cartridges having a circular, floppy, magnetic or optical disk rotatably mounted within a disk cartridge case are well known. The cartridge is mountable in a disk drive apparatus to rotate and access the recording disk by a magnetic or optical recording head for recording or reproducing information. The cartridge includes a rotatable disk, a cartridge case for housing the disk, and a shutter slidably disposed on a front wall of the case.

Upper and lower walls mate to form the cartridge case. A drive shaft opening is formed through the lower wall to receive a drive shaft to rotate the disk within the cartridge case. A head access opening is formed in the upper and lower walls to access the disk. The head access opening is opened and closed by the shutter which slides between open and closed positions. A spring biases the shutter closed to cover the head access opening.

A press fit assembly boss connects the upper and lower walls of the diskette case, as shown in FIGS. 1 and 2. The assembly boss typically includes a post 138 insertable in a socket 140. The post 138 is a split post design having two halves 138A, 138B. This post 138 flexes at its base which decreases the gap at the top and causes the post to taper upon engagement with the socket 140. This system is susceptible to producing debris during assembly.

This assembly boss is used temporarily during assembly. The permanent assembly is performed by ultrasonic welding of small V-shaped weld beads which are located on or around other bosses in the other corners. Posts and sockets in those corners serve only as the site of the weld beads. The alignment of the shell, both temporarily and permanently, occurs in a press fit boss with the prime reference post. Performance of this assembly boss is affected by its lubricity. The mold used to manufacture a case with this assembly boss must be fabricated by electrical discharge machining. This requires subsequent polishing operations.

SUMMARY OF THE INVENTION

A press fit assembly boss for aligning and assembling the upper and lower walls of a diskette case according to the present invention overcomes the disadvantages of known assembly bosses. The assembly boss includes a circular cylindrical post formed on one case wall and a cylindrical socket formed on the other case wall. The cylindrical post is an unbroken cylinder and has walls with a thickness less than 20% of the diameter of the post. The inner surface of the socket includes two opposing planar sections separated by a distance less than the outer diameter of the post. Insertion of the post in the socket deforms the post to secure the post within the socket without creating any debris during assembly or disassembly. The post can be removed from the socket with less than 4.9 Newtons of resistance using automated assembly techniques.

DETAILED DESCRIPTION OF PREFERRED EMBODIMENTS

Figure 1:
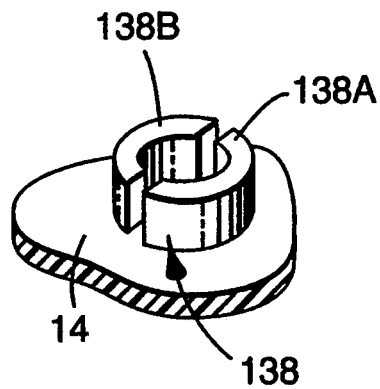
FIG. 1 is a perspective view of the prior art post for an assembly boss.
Figure 2:
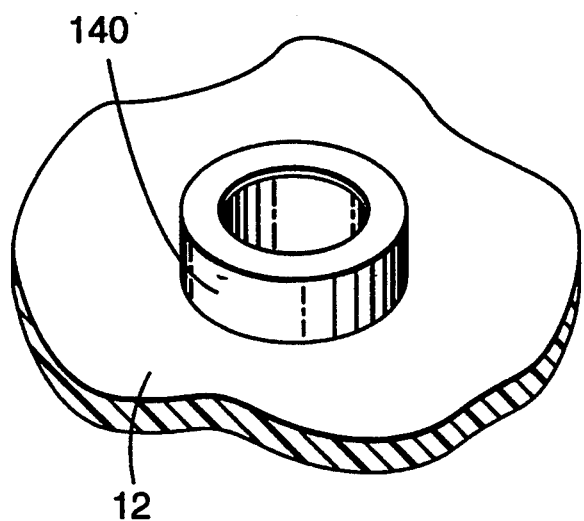
FIG. 2 is a perspective view of the prior art socket for an assembly boss.
Figure 3:
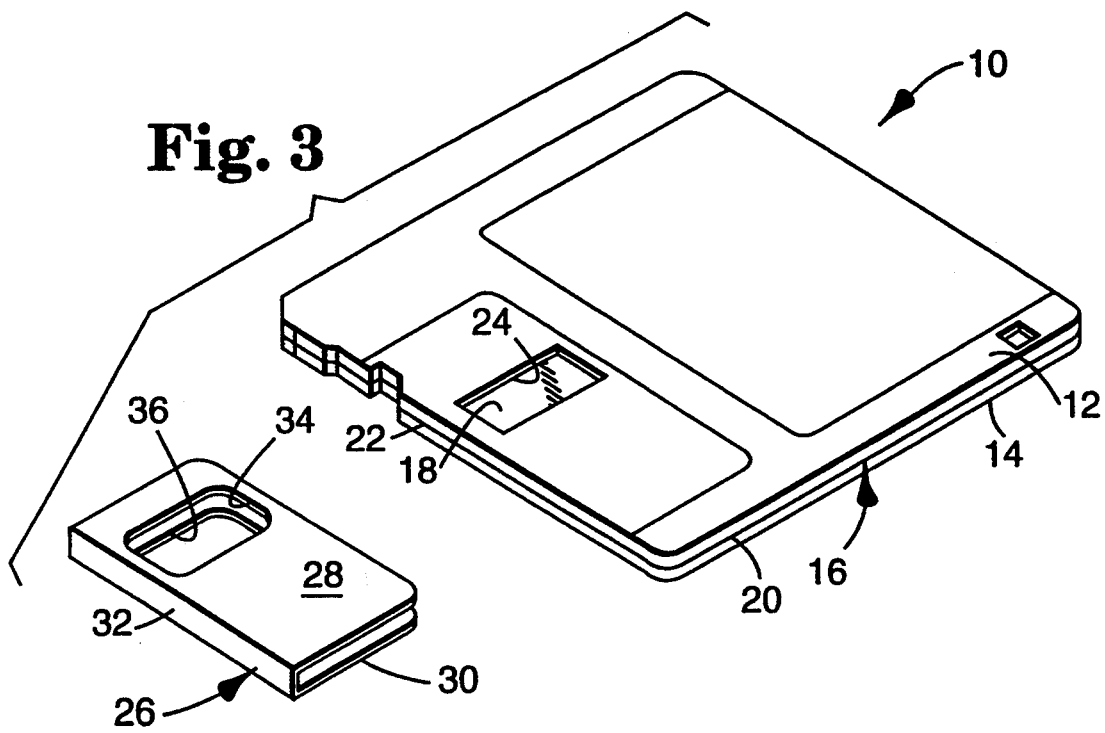
FIG. 3 is a perspective view of a cartridge according to the present invention.
Figure 4:
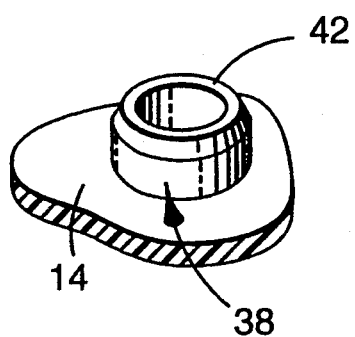
FIG. 4 is a perspective view of the post for an assembly boss of the cartridge of FIG. 3.
Figure 5:
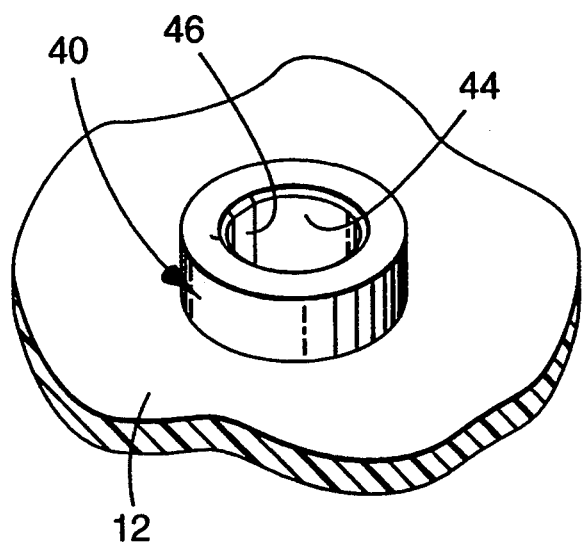
FIG. 5 is a perspective view of the socket for an assembly boss of the cartridge of FIG. 3.

A $3\frac{1}{2}$ inch rigid disk cartridge is shown in the figures and described below. The present invention could also be used with $5\frac{1}{4}$ inch disk cartridges, 2 inch disk cartridges, or other size cartridges. Referring to FIG. 1, the cartridge 10 includes an upper case wall 12 and a lower case wall 14 which are substantially identical in shape and mate to form a thin, substantially rectangular case 16. The case 16 is preferably formed of a rigid plastic material such as injection molded ABS resin. A circular floppy disk 18 formed of a magnetizable composition and having a circular central hub typically formed of metal is rotatably mounted within the case 16 between two circular nonwoven wipers (not shown) which serve as shock absorbers and cleaners for the disk 18. Each wiper contacts the disk surfaces to wipe debris from the disk 18 and permit the disk to rotate without interference from the case walls 12, 14.

Peripheral edge walls extend perpendicularly from the upper and lower case walls 12, 14 and form the side walls 20 and the front wall 22 of the case 16, and an interior pocket for the disk 18. The lower case wall 14 has a central opening (not shown) aligned with a central axis of the disk 18 for receiving a drive shaft of a disk drive apparatus to rotate the disk 18 within the case 16.

The upper and lower case walls 12, 14 also have elongated, generally rectangular access openings 24 located between the central axis of the case 16 and the front wall 22. The openings 24 permit a read-write head of the disk drive apparatus to access the disk 18. A U-shaped shutter 26 is slidably disposed on the front wall 22 of the cartridge case 16 and is movable between an open position and a closed position. The shutter 26 includes an upper arm 28, a lower arm 30, and a base portion 32 which connects the upper and lower arms 28, 30. The upper arm 28 has an opening 34 which registers with the upper head access opening 24 and the lower arm 30 has an opening 36 which registers with the lower head access opening 24 when the shutter 26 is in the open position.

A press fit assembly boss for aligning and assembling the upper and lower case walls 12, 14 can be used temporarily during manufacture as well as for permanent assembly of the disk cartridge. During assembly, the parts are disassembled as part of the process: the upper and lower case walls 12, 14 are partially assembled in several operations and shell pairs are assembled for shipping and movement between operations, and then are disassembled for further manufacturing operations before final assembly. The press fit assembly boss also can be used in other environments with both thin parts and thick parts including video cassettes and other tape cartridges and to hold housings together as well as to secure internal components of cassettes, such as sleeves and reel lock components, to the housing.

The press fit assembly boss includes a circular cylindrical post 38 formed on the lower case wall 14 and a generally complementary cylindrical socket 40 formed on the upper case wall 12. The cylindrical post 38 is formed as a complete, unbroken cylinder and has thin walls with a thickness less than 20% of the outer diameter of the post. The post 38 can be removed from the socket 40 with less than 500 grams of resistance using a vacuum of the automated assembly equipment used during assembly of disk cartridges. Alternatively, the removal resistance can be selected for a predesignated application. This force is a function largely of the wall thickness of the post being deformed. The top 42 of the cylindrical post 38 is tapered to assist in assembly.

The cylindrical socket 40 has an inner surface 44 that is generally complementary to the outer surface of the cylindrical post. However, the inner surface 44 of the socket 40 includes two opposing planar parallel sections 46 separated by a distance less than the outer diameter of the post. This creates a non-circular inner surface. Insertion of the post 38 in the socket 40 deforms the post to secure the post within the socket without creating any debris during temporary assembly, disassembly, or permanent assembly.

The unbroken cylindrical post 38 flexes radially and uniformly along its height. The post 38 flexes more uniformly and more continuously than a split post design. That is, the planar parallel sections 46 cause the cylindrical post 38 to distort from a circular cylinder to an oblong cylinder with little axial distortion. The top 42 of the cylindrical post 38 does not flex significantly more than the bottom of the post 38. In contradistinction, in the known split post 138, the top of each half 138A, 138B flexes toward each other with the gap at top decreasing, while the bottom of each half flexes less. Each half 138A, 138B bends independently.

The unbroken cylindrical post design prevents the post 38 from tapering upon engagement with the socket 40 and reduces the effects of its lubricity on the engagement. Radial flexing also aligns the parts to be connected better by reducing the amount of bending and avoiding part shifting. The manufacture of this assembly boss is also easier as the mold fabrication process can be accomplished by grinding components rather than by using electrical discharge machining. This eliminates most of the polishing operations and permits molding parts with closer tolerances. The part details are easy to measure on both the mold and the plastic part.

Also, various types of plastic, colorants, and manufacturing processes, and various temperatures and humidities can be used. Studies have included the use of commercially available ABS and HIPS material, both of which are available in many classes with different properties for flow characteristics and melt temperatures. The colorant can be purchased in a premixed resin or mixed with the material in granular form. The color ratio varies with the colorant used from 2% to 15% by weight. The assembly boss of this invention compensates for all of the variables involved in the plastic type, the material color, and temperature and other climatic changes occurring during assembly and therefore is usable with all flexible plastics. Moreover, this assembly boss has a thinner cross section than is achievable with known bosses. This assembly boss is 50% thinner than known bosses. The boss does not need a thick cross section for strength because the flexing occurs radially. This improves the cosmetic appearance of the finished diskette cartridge as a thicker cross section would cause sink marks on the outside of the cartridge.

This press fit assembly boss can be used in only one corner of the diskette for part handling purposes or can be used in up to all of the diskette corners with or without adhesive to permanently assemble the diskette.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be affected therein by one skilled in the art without departing from the scope or spirit of the invention.

I claim:

1. A press fit assembly boss for aligning and assembling two components comprising:
   a hollow cylindrical post having an outer width formed on an upper component; and
   a cylindrical socket formed on a lower component, wherein the socket comprises an inner surface which includes two two-dimensional opposing sections separated by a distance less than the outer width of the post, wherein the two opposing sections on the inner surface of the socket are planar and parallel, wherein insertion of the post in the socket deforms the post to secure the post within the socket without creating any debris during assembly or disassembly and wherein the insertion of the post in the socket does not deform the socket to affect the assembly of the two components.

2. The assembly boss of claim 1 wherein the two components are upper and lower case walls of a diskette cartridge.

3. The assembly boss of claim 2 wherein the cylindrical post is formed as a complete, unbroken cylinder.

4. The assembly boss of claim 1 wherein the cylindrical post is circular and has an outer diameter and the inner surface of the cylindrical socket is elongated.

5. The assembly boss of claim 4 wherein the cylindrical post has thin walls with a thickness less than 20% of the post outer diameter.

6. The assembly boss of claim 1 wherein the boss is capable of being assembled and disassembled without damage or distortion to the assembled components or the boss, and wherein when the boss is assembled there is no entry into the area between the two components from outside of the two components through the boss.

7. The assembly boss of claim 1 wherein the interior of the socket does not pass through the lower component.

* * * * *